United States Patent [19]

Appelgren et al.

[11] Patent Number: 5,019,399
[45] Date of Patent: May 28, 1991

[54] GRANULAR PRODUCT (IV)

[75] Inventors: Curt H. Appelgren, Kungsbacka; Ulf A. Odda, Uppsala, both of Sweden

[73] Assignee: Lejus Medical Aktiebolag, Molndal, Sweden

[21] Appl. No.: 376,577

[22] Filed: Jul. 7, 1989

[51] Int. Cl.$^5$ .............................................. A61K 9/16
[52] U.S. Cl. .................................. 424/493; 424/440; 424/441; 424/489; 424/494; 424/495; 424/496
[58] Field of Search ............... 424/493, 489, 496, 494, 424/466, 495, 440, 441

[56] References Cited

U.S. PATENT DOCUMENTS

| | | | |
|---|---|---|---|
| 3,928,633 | 12/1975 | Shoaf | 426/548 |
| 4,690,834 | 9/1987 | Appelgren et al. | 427/189 |
| 4,818,539 | 4/1989 | Shaw | 424/441 |

FOREIGN PATENT DOCUMENTS

WO81/01100 4/1981 PCT Int'l Appl. .
2122490 1/1984 United Kingdom .

*Primary Examiner*—Thurman K. Page
*Assistant Examiner*—D. Gabrielle Phelan
*Attorney, Agent, or Firm*—Burns, Doane, Swecker & Mathis

[57] ABSTRACT

The present invention relates to a granular product, whereby it consists of a solid product, which has been provided with a coating of a water-soluble material, which has been provided as a melt, whereby the water-soluble products consists of one or more of polyethylene glycol, xylitol, sorbitol, lactitol, lecitin, and other water-soluble products, as well as a process for preparing the granular product.

4 Claims, 1 Drawing Sheet

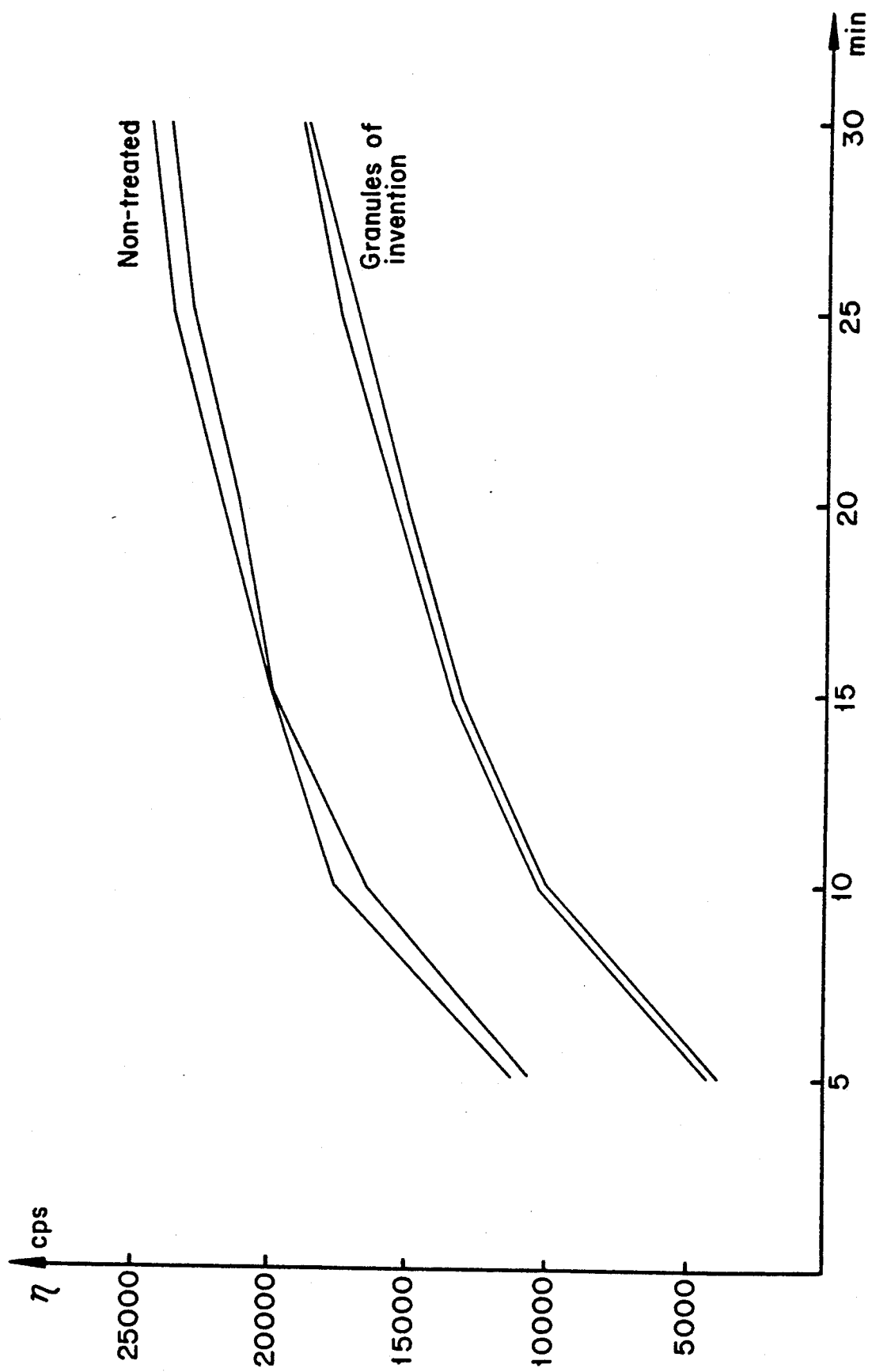

GRANULAR PRODUCT (IV)

TECHNICAL FIELD

The present invention relates to granular products, and a process for preparing same.

The object of the present invention is to obtain granular products, which can easily be added to a liquid, such as water in order to be wetted without then being agglomerated, i.e. in order to obtain what is called instanticizing.

BACKGROUND OF THE INVENTION

Powderous materials which are to be tabletted or used in another way, do not have, a as rule, the correct flowing properties but are cohesive, and thus it is general practice to convert the powder into a granulate prior to use.

At the production of the granulate the powder is provided with a solvent, optionally containing a binding agent to the formation of a semi moist mass, which is then formed into agglomerates and is dried to granules, or if a suitable size of the agglomerate is obtained directly, is immediately dried to a suitable particle size which varied dependent on the intended use. Optionally, the granulate has to be crushed to obtain the right particle size and particle size distribution. The size may vary from some 100 $\mu$m to 1.5 mm in diameter.

All products are, however, not suited for a treatment using a solvent and often an inert carrier has to be added to obtain a suitable granulation.

One way of obtaining a solvent free granulation is to add another powder having good binding properties, to compress the pulverulent mixture into tablets or briquettes and then to crush these into a suitable particle/granulate size.

It shall be noted that a coating with a melted or softened material is previously known. Thus it is known to introduce, into a fluid bed apparatus, a powder and a wax and to obtain a wax coating by increasing the temperature of the air used to be blown through the bed. It is also known to add a powder to a melt present in a vessel provided with a jacket, to allow the melt to stiffen, and to crush it to a suitable size. These processes, however, lead to high increases of temperature in the material to be treated for a long time.

A great problem within particularly the food, feedstuff and pharmaceutical industry is to obtain products which can easily be wetted without forming lumps (agglomeration). Particularly, products which are either very hydrophilic or very lipophilic create problems. The hydrophilic compounds cause problems as they absorb water too soon and thus create lumps, which are almost impossible to break, and the lipophilic compounds cause problems as they just float on the top and not become wetted at all, and not become suspended either. Thus one wishes to create dry products which can be easily suspended in water such as those used in the production of dry mixes for bread, sauces, nutrients, soups, desserts, and others, as well as antacids, fibrous materials such as bulk agents such as guar gum powder, isphagula, oat bran, wheat bran, alginic acid, and other products.

Another requirement is that the particle size shall be as small as possible in order to obtain the best possible mixing properties with other pulverulent materials, which are present in a composition.

A further problem within said industries is to be able to distribute fat in a produce without creating a later problem at the mixing with a liquid, or because the fat is not uniformly distributed in connection with cooking, or other preparation.

BRIEF DESCRIPTION OF THE DRAWINGS

The sole FIGURE is a graph of CPS against time of non-treated granules and granules of the invention.

BRIEF SUMMARY OF THE PRESENT INVENTION

It has now surprisingly been shown possible to be able to solve this problem and to create such instanticizing by means of the present invention which is characterized in that the solid product which is to be given such an instanticizing property is provided with a layer of one or more of polyethylene glycol, xylitol, sorbitol, lactitol, lecithin, and other water-soluble compounds, which compounds are provided as a melt.

Further characteristics are evident from the accompanying claims.

Suitable products to be instanticized are dry milk, tomato powder, chocolate powder, hip powder, wheat flour, cookie and bread mixes, cold mixed sauces, (such as sauce bernaise, custard, chocolate), nutrient compositions used in tube feeding, water-soluble polysaccharides, such as guar gum flour, isphagula, polycarboxylic acids, hydroxypropyl methyl cellulose, antacids, ($CaCO_3$, $Mg(OH)_2$), cereal fibers such as oat bran, wheat bran, alginic acid, and other types of gelling or non-gelling fibers (beet fibers, soya fibers), or hydrophilic polymers (PVP, polyethylene oxide). A gelling fiber is hereby a fiber which absorbs several times its own weight of a liquid. By means of the invention thus a controlled gelling is obtained.

The distribution of fat in the solid product to be instanticized can also be done preferably by means of the present invention for use in cookie mixes and sauce powder.

Suitable melts consist of polyethylene glycol (PEG 400 to PEG 6000), xylitol, sorbitol, lactitol, lecitin and other water-soluble compounds. It has turned out that a false mixture of polyethylene glycol and a sugar alcohol (xylitol, sorbitol, lactitol) is particularly suitable, whereby, one uses e.g. a 5% melt of xylitol (or another sugar alcohol) and polyethylene glycol in the weight relationship 80:20, calculated on the final product, and which melt has a temperature of 10° to 20° C. above the melting point. Other mixed melts are polyethylene glycol:lecithin and lecithin:sugar alcohol.

The coating using a melt of the type indicated shall thereby be carried out under such conditions that the temperature of the solid product is not considerably increased, i.e., does not increase more than 5°–10° C. for a longer time period, i.e., more than 30 sec.

Momentarily, the temperature increase might be greater, but due to a rapid treatment the granules obtained are chilled in such a way that the increase of the temperature during at most 30 sec. extends to 5°–10° C. only.

The relation between solid, material:melt is 70–97:–30–3. The melt has in general a temperature of 10°–20° C. above the melting point of the product.

The coating of the solid product with itself can be done in an apparatus described in SE-C-7903053-2 and in such a way as described in SE-A-8500487-7.

The apparatus according to SE-C-7903053-2 comprises a mixing house provided with a cover. Within the housing a disc is arranged which disc consists of an upper disc and a lower disc, which disc is rotatably mounted around a shaft by means of a bearing. Between the upper and the lower discs there is a hollow space which is connected to the upper side of the upper disc via an annular slot consisting of two parts which both take the shape of a circumferential surface of a cut cone with its point directed downwardly. The upper disc has blades cut on its upper side and optionally cut, or mounted blades on its side underneath. Between the blades spaces exist which are intended to receive particles to be coated while said space optionally being divided into compartments by means of said blades is intended to receive the melt which is to be used for coating. The lower disc is provided with an edge extending around it close to the opening of the slot. At its periphery the lower disc is provided with blades for throwing out the final product via a diffuser and an outlet. The cover is provided with a compartment placed above the center of the disc which compartment is arranged to receive the particulate solid material for a further transport thereof to said above mentioned spaces between the blades. The particulate solid material is fed to the compartment of the cover by means of a transporting device, e.g. a feeding screw. The liquid phase is being fed to the space via a tube.

At the coating operation according to SAE-A-8700487-7 the discs are rotated within the housing around the shaft with a revolving speed of between 1000 to 500 rpm. A suitable peripheral speed using a disc diameter of 300 mm is 1500 to 5000 m per minute whereby the lower speed is used for embedment/agglomeration and the higher for coating. The coating melt is thereby fed to the apparatus via the tube to the hollow space between the upper and the lower discs. The tube is thereby provided with heating means in order to keep the material in melted, liquid form. By means of the centripetal force and the blades the melt is thrown outwardly through the slot and further through the outer slot. The melt hereby takes the form of a membrane which extends outwardly all the time simultaneously as it becomes thinner. When the melt leaves the outer slot the membrane is torn up into very small droplets when it leaves the edge, whereby a mist curtain of droplets having a microscopic size are formed. Simultaneously with the addition of melt through the tube a particulate material is added by means of the transporting device to the compartments and further on to the spaces on the upper side of the upper disc. From there the particulate material is thrown, by means of the centripetal force, and the blades, outwardly towards the periphery of the upper disc, simultaneously as it is deagglomerated into primary particles which meet with and pass the mist curtain at the edge. The particles hereby obtain a surface coating of the melt and are further thrown outwardly to the blades arranged at the periphery of the lower disc, which blades throw the product out of the apparatus via the diffuser and the outlet. Depending on the number of blades their height and the through-put per time unit, which through-put can be varied by varying the outlet area, one can get an agglomeration of the particles, or get the particles out as separate solely coated particles. The granulate obtained is directly chilled with air during the throwing out thereof and is further chilled at a following separation in a cyclone or the like.

EXAMPLE 1

800 g of guar gum fiber are introduced as solid material in combination with flavoring agents q.s. (orange flavor) and coloring agent q.s. in an apparatus according to the above described and are added a melt of 40 g of polyethylene glycol (PEG 4000) and 160 g of xylitol having a temperature of 115° C. In the contacting zone between solid material and melt the solid material was coated with the molten material to provide a solid layer of melt upon the solid material. The particle size was 200 $\mu$m to 1500 $\mu$m.

The final product thus obtained showed a very suitable dispersability according to general standard. It is hereby readily dispersible and gels during 15 minutes to provide a creamy dispersion. As evident from the attached FIGURE the gelation, the viscosity obtained, is much faster for an untreated material than for a material obtained according to Example 1 above. The determination was made in a Brookfield viscosimeter, type LV 3, spindle 3, rotation 3 rpm. The viscosity 10000 means a creamy or syrup-like consistency.

EXAMPLE 2

Skim milk powder was introduced as solid substance in an apparatus according to the description above and was added a melt of 10% of polyethylene glycol (PEG 6000) and 90% of xylitol. At the contact between powder and melt a 10% coating of melt, agglomeration and coating of the particles was obtained.

The powder showed very good flowability properties and was easily soluble.

EXAMPLE 3

The powder component of a tomato soup was treated in the same way as above, Ex. 1 and Ex. 2, using a melt of 10% polyethylene glycol (PEG 400) and 90% of lactitol. The temperature of the melt was 120° C. The coating with the melt provided a 10% coating calculated on the final product.

EXAMPLE 4

610 g of guar gum fiber and 140 g of flavor and coloring agents were used as solid material and were coated with a melt of 250 g of xylitol. The product obtained showed good dispersability properties.

EXAMPLE 5

700 g of guar gum fibers and 50 g of flavoring and coloring agents were used as solid material and were coated with a melt of 250 g of xylitol. The product obtained showed excellent dispersability properties.

EXAMPLE 6

800 g of Carbopol (polycarboxylic acid) were used as solid material and were coated with a melt of 200 g of xylitol.

EXAMPLE 7

850 g of hydroxypropyl methyl cellulose (HPMC, 100 cP as a 2% aqueous solution at 20° C.) were used as solid material and was coated with a melt of 150 g of xylitol.

EXAMPLE 8

800 g of hydroxypropyl methyl cellulose (HPMC, 4000 cP as a 2% aqueous solution at 20° C.) were used as solid material and was coated with a melt of 200 g of xylitol.

What is claimed is:

1. A wettable granular product comprising a solid product coated with a water-soluble material comprising polyethylene glycol in combination with xylitol, sorbitol, lactitol or lecithin, which water-soluble material is coated onto the solid product in the form of a melt, wherein the solid product is 70–97% by weight and the water-soluble material is 30–3% by weight.

2. A wettable granular product according to claim 1 wherein the solid product is guar gum fibers and the water-soluble material is polyethylene glycol/xylitol (20:80) in the weight ratio 80:20.

3. A wettable granular product according to claim 1 wherein the solid product is guar gum fibers and the water-soluble material is polyethylene glycol/sorbitol (20:80) in the weight ratio 85–80:15–20.

4. A wettable granular product according to claim 1 wherein the solid product is guar gum fibers and the water-soluble material is polyethylene glycol/lactitol (20:80) in the weight ratio 90–80:10–20.

* * * * *